United States Patent [19]

Takeguchi et al.

[11] Patent Number: 4,953,214
[45] Date of Patent: Aug. 28, 1990

[54] SIGNAL ENCODING AND DECODING METHOD AND DEVICE

[75] Inventors: Nobuyasu Takeguchi, Osaka; Toshihide Akiyama, Hirakata; Kenichi Takahashi, Kyoto, all of Japan

[73] Assignee: Matushita Electric Industrial Co., Ltd., Osaka, Japan

[21] Appl. No.: 222,171

[22] Filed: Jul. 21, 1988

[30] Foreign Application Priority Data

Jul. 21, 1987 [JP] Japan ............................. 62-181520
Sep. 21, 1987 [JP] Japan ............................. 62-236526
Dec. 8, 1987 [JP] Japan ............................. 62-309922

[51] Int. Cl.$^5$ ..................... G10L 5/00; G06F 15/40
[52] U.S. Cl. ................................. 381/31; 381/35; 381/40; 364/518; 358/136
[58] Field of Search ............... 381/31, 35, 4 D; 364/518; 358/136

[56] References Cited

U.S. PATENT DOCUMENTS 4,670,851  6/1987  Murakami et al. ............... 364/518
4,802,222  1/1989  Weaver .......................... 364/413.06

OTHER PUBLICATIONS

"A Fractal Based Approach to Image Compression", ICASSP, 86, 11A.3.
"Quantizing for Minimum Distortion", Joel Max; IRE Transactions on Information Theory, Mar. 1960, pp. 7-12.

Primary Examiner—Emanuel S. Kemeny
Attorney, Agent, or Firm—Wenderoth, Lind & Ponack

[57] ABSTRACT

A method of encoding and decoding image and/or audio signals includes an encoding step comprising previously preparing a quantization table which has pairs of a sampling interval and a quantized difference value, calculating a difference value between a given initial value and a sampling point succeeding to the initial value, comparing the calculated difference value with the quantization table, and searching the most matching quantization level. The search is started from the sampling point immediately succeeding to the initial value and then stopped upon finding of the matching quantization level. The index of that matching quantization level is transmitted. The decoding step comprises preparing the same quanitization table as used in the encoding step, determining the sampling interval and the quantized difference value based on the index received, and adding the quantized difference value to the initial value to obtain a decoded value. In case there are present two or more sampling intervals, the corresponding samples are interporated. As a result, the sampling interval is prolonged in the flat parts of signal and shortened in the steeply changing parts, thereby providing compression fit for human visual and auditory characteristics.

7 Claims, 6 Drawing Sheets

| INDEX | SAMPLE NUMBER | RANGE OF THRESHOLD VALUES | REPRE-SENTATIVE VALUE |
|---|---|---|---|
| 0 | 1 | 16 ~ 26 | 21 |
| 1 | 1 | 27 ~ 41 | 34 |
| 2 | 1 | 42 ~ | 52 |
| 3 | 2 | 8 ~ 16 | 12 |
| 4 | 2 | 17 ~ | 24 |
| 5 | 3 | 4 ~ | 6 |
| 6 | 4 | 4 ~ | 6 |
| 7 | 5 | - | 0 |

SIGNAL ENCODING AND DECODING METHOD AND DEVICE

BACKGROUND OF THE INVENTION

1. Field of the Invention

The present invention relates to an encoding and decoding method and device for compression encoding, transmitting and decoding of information of an image signal or audio signal.

2. Description of the Prior Art

In the field of image or voice communication, there has so far been performed compression of signals or highly efficient encoding of data in order to efficiently utilize the limited line capacity. One practical example is an encoding and decoding device for used in TV conference or TV telephone.

"A Fractal Based Approach To Image Compression", ICASSP, 86, 11A.3 is known to the present inventors as a reference closely related to the present invention. This reference is to compress image data using the fractal concept. The basic concept is in that "yard stick" of certain fixed length is used as a unit to cover a signal, and a horizontal distance of the cross point at which "yard stick" intersects the signal, i.e., sampling interval and a positive or negative sign bit respectively indicative of increase or reduction in an amplitude value are both transmitted for restoration of the signal at the decoding side. The practically implementing method employs "trigger function" in place of "yard stick", the trigger function being compared with the signal to determine a sampling interval. This makes the sampling interval wider for a signal including many flat parts, so that the signal may be compressed to a large extent.

However, because "trigger function" is a unique function for all of successive data samples, the above method cannot follow a multi-value graded image including steeply changing parts, resulting in a problem that the image may be blurry in its edge. Another problem is in that since representative values used in the decoding step are given by those threshold values which were used in the encoding step, the decoded values are always less than the amplitude values of the original signal, and hence the mean square error is increased. It is to be noted that the above reference teaches only the method, and does not propose a practical device.

SUMMARY OF THE INVENTION

It is an object of the present invention to provide a method and device for encoding and decoding signals, which are fit for human visual and auditory characteristics, and which are adapted to reduce the information content necessary for transmitting and storing an image or audio signal.

To achieve the above object, the present invention resides in a method of encoding and decoding image and audio signals, any of the signals being subjected to sampling and having a multiplicity of sampling points each represented by a quantized amplitude value.

An encoding step comprises the steps of:
transmitting an amplitude value of a given sampling point as an initial value;
subtracting the initial value from each of amplitude values of n sampling points (where n is a predetermined integer) to calculate n difference values therebetween, and calculating positive or negative signs, which respectively indicate varying directions of the amplitudes imposed by the difference values with respect to the initial value and absolute values of the difference values;
previously preparing a quantization table which has threshold values and representative values expressed in terms of amplitude values, defines an ordered set of n quantization scales (where n is a predetermined integer) each comprising at least one threshold value and a representative value, and also defines index values different from one another for all the representative values of said n quantization scales;
comparing a series of n difference absolute values with a series of n quantization scales included in the quantization table sequentially from the sampling point adjacent to the initial value until the maximum n-th sampling point, and selecting a representative value of the most suitable quantization scale;
transmitting the index value of the selected representative value of the quantization scale and the positive or negative sign; and
repeating the foregoing steps with the sum of the selected representative value of the quantization scale and the current initial value being set as a subsequent initial value.

A decoding step comprises the steps of:
receiving the amplitude value of the transmitted sampling point as an initial value;
previously preparing the same quantization table as used during the encoding step;
determining the number m and the representative value corresponding to the received index value and the sign by making use of the quantization table;
interpolating the amplitude value of each of (m−1) sampling points between the initial value and the sum of the initial value and the representative value of m-th sampling point; and
repeating the foregoing steps with the sum of the initial value and the representative value of m-th sampling point being set as a subsequent initial value.

The foregoing method allows sampling to be finely carried out in the steeply changing part, but roughly carried out in the moderately changing part, so that image and audio signals can be encoded with high efficiency in better fitting for human visual and auditory characteristics.

DESCRIPTION OF THE PREFERRED EMBODIMENTS

One embodiment of the present invention will be described below with reference to the drawings.

Figure 1:
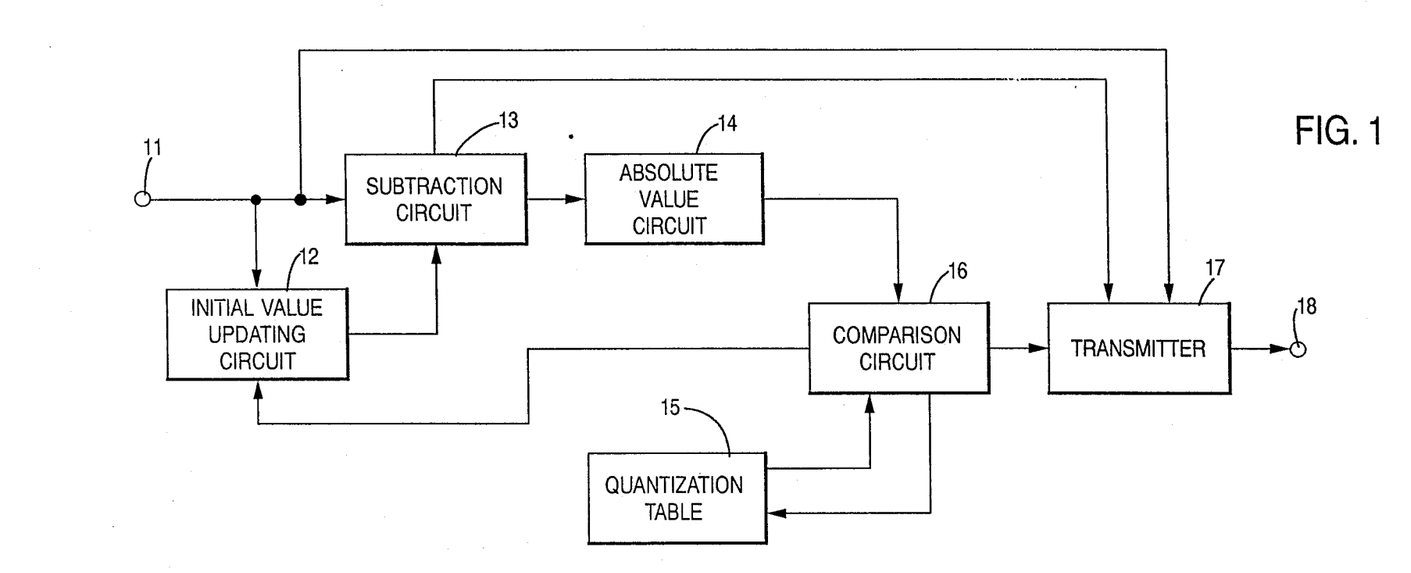
FIG. 1 is a block diagram of one embodiment of an encoding device for encoding signals according to the method of the present invention.

FIG. 1 is a block diagram of one embodiment of an encoding device according to the present invention.

The encoding device of FIG. 1 comprises an input terminal 11, an initial value updating circuit 12, a subtraction circuit 13, an absolute value circuit 14, a quantization table 15, a comparison circuit 16, a transmitter 17, and an output terminal 18. Applied to the input terminal 11 is a series of image or audio data after being subjected to sampling and quantizing. First, an initial value $S_i$ is held in the initial value updating circuit 12. The initial value $S_i$ is also supplied to the transmitter 17. The subsequent data $S_{i+1}$ and the output $S_i$ of the initial value updating circuit 12 are supplied to a subtraction circuit 13 where both $\Delta S1 = S_{i+1} - S_i$ and the sign $F1 = \text{sign}(\Delta S1)$ are calculated. The output $\Delta S1$ of the subtraction circuit 13 is then supplied to the absolute value circuit 14, while F1 is held therein until receiving of an indication from the comparision circuit 16. The absolute value circuit 14 calculates an absolute value $|\Delta S1|$ of $\Delta S1$ and sends it to the comparison circuit 16. The quantization table 15 is a table having an ordered set of n quantization scales (where n is a positive integer). Each quantization scale has at least one quantization level, and each quantization level has a single representative value Rk. The quantization levels are partitioned from each other by respective threshold values. The quantization table 15 outputs the threshold value of first quantization scale and sends it to the comparison circuit 16. The comparison circuit 16 compares the threshold value of first quantization scale with the absolute value $|\Delta S1|$ to check to which quantization level the absolute value $|\Delta S1|$ belongs. If $|\Delta S1|$ is found within the threshold value of any quantization level, this means the presence of a matching quantization level. In this case, the comparison circuit 16 supplies the index of quantization level and the sign F1 delivered from the subtraction circuit 13 to the transmitter 17. The comparison circuit 16 also resets the quantization table 15. Further, the comparison circuit 16 sends the representative value Rk of the selected index to the initial value updating circuit 12. The initial value updating circuit 12 holds the sum of the initial value $S_i$ originally held therein and the representative value Rk as a new initial value. The above process is effected when the matching quantization level is present.

If the absolute value $|\Delta S1|$ is less than the minimum threshold value of first quantization scale, this means the absence of a matching quantization level. In this case, the subsequent data $S_{i+2}$ is supplied to the subtraction circuit 13 where $\Delta S2 = S_{i+2} - S_i$ is calculated. $\Delta S2$ is processed in a like manner to $\Delta S1$. More specifically, the quantization table 15 outputs the threshold value of second quantization scale, which is then compared with $|\Delta S2|$ in the comparison circuit 16. If a matching quantization level is found, the comparison circuit 16 supplies both the index of that quantization level and the sign delivered from the subtraction circuit 13. If not, the subsequent sampling point $S_{i+3}$ is supplied to the subtraction circuit 13 where $\Delta S3 = S_{i+3} - S_i$ is calculated. Thereafter, the similar process will be repeated until calculation of $\Delta Sn = S_{i+n} - S_i$ at maximum. The transmitter 17 outputs a series of indices and signs from the output terminal 18.

Figure 2:
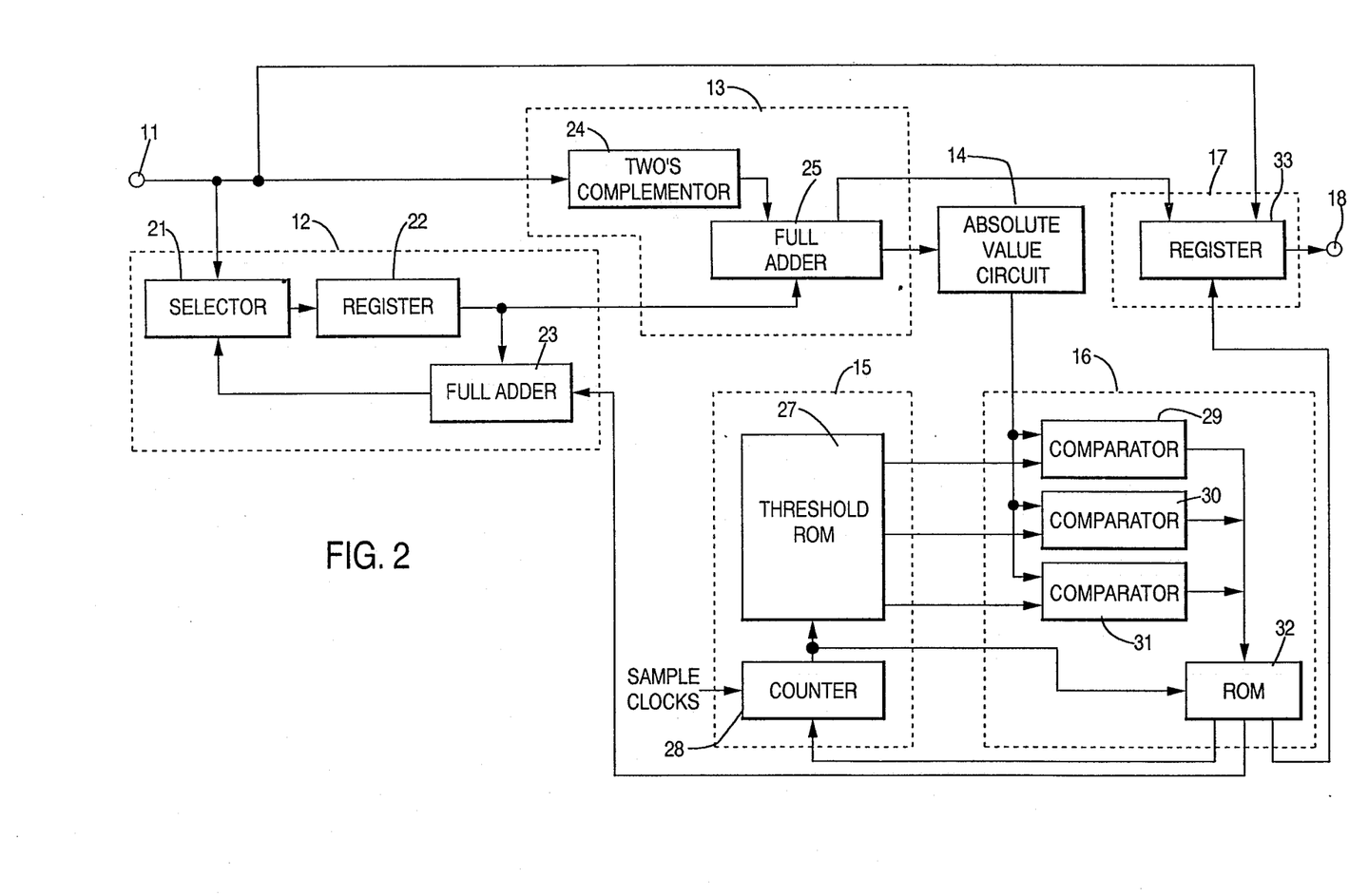
FIG. 2 is more detailed block diagram of FIG. 1.

FIG. 2 is a more detailed block diagram of FIG. 1. The initial value updating circuit 12 comprises a selector 21, register 22 and full adder 23. The selector 21 makes switching action to select either the first initial value or the updated initial value. The initial value means, for example, an amplitude value of first pixel on one horizontal scanning line in connection with image.

The register 22 holds the initial value selected by the selector 21. The full adder 23 adds the current initial value held in the register 21 and the representative value Rk of the index selected by the comparison circuit 16, and then outputs the sum therefrom.

The subtraction circuit 13 comprises a two's complementer 24 and a full adder 25. The two's complementer 24 operates to determine the subtractive value of the data applied thereto for implementing the subtraction in the full adder 25. The full adder 25 adds the initial value held in the register 22 and the output of the two's complementer 24 to thereby obtain the resulting difference value $\Delta S1$. At the same time, the positive or negative sign F1 is also obtained. The absolute value circuit 14 functions to determine $|\Delta S1|$.

Figure 3:
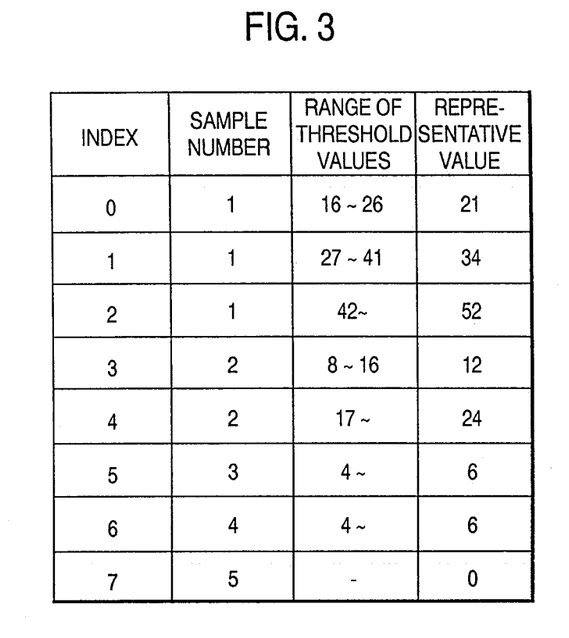
FIG. 3 is one example of quantization table.

The quantization table 15 comprises a ROM (Read Only Memory) 27 for storing threshold values and a counter 28. The counter 28 is reset by the comparison circuit 16 upon updating of the initial value, and then counted up by sampling clocks applied thereto. FIG. 3 shows the relationship among the index, the sample number, the range of threshold values, and the representative value. The ROM 27 is designated to receive the output of the counter 28, i.e., the sample number, as an address input and responsively output the lowest value of each range of threshold values. Assuming for the sample S1 to be input, for example, the counter 28 outputs 1 as the sample number and supplies it to the ROM 27 as an address for accessing. The ROM 27 outputs three values, i.e., 16, 27 and 42 as seen from FIG. 3, and supplies the value 16 to a comparator 29, the value 27 to a comparator 30, and the value 42 to a comparator 31, respectively, the comparators 29–31 being constituent components of the comparison circuit 16. The output of the absolute value circuit 14 is supplied to each of the comparators 29, 30 and 31, and the resulting output values are used for selection of a matching quantization level. More specificatlly, when the output of the absolute value circuit 14 is equal to or greater than the output of the ROM 27, one or more of the corresponding comparators 29, 30 and 31 issue a logical "true" output. With the absolute value circuit 14 outputting 16–26, only the comparator 29 issues a "true" output. With the absolute value circuit 14 outputting 27–41, the comparators 29 and 30 issue each a "true" output. With the absolute value circuit 14 outputting 42 or more, all of the comparators 29, 30 and 31 issue "true" outputs. Assuming that the output of the absolute value circuit 14 is equal to 20, for example, only the comparator 29 issues a "true" output, while the remaining comparators issue "false" outputs.

A ROM 32 is designed to output an index, a representative value, and a reset signal for the counter 28 by making use of the true/false outputs of the comparators 29, 30, 31 and the counter value of the counter 28 as respective address inputs. In case of the foregoing example, since the counter 28 issues the output of 1 and the range of threshold values is 16–26, i.e., the comparator 29 issues a "true" output and the comparators 30, 31 issuee "false" outputs, the ROM 32 delivers the index 1 and the representative value 21 as shown in FIG. 3. The ROM 32 outputs a reset signal and supplies it to the counter 28, when at least one of the comparators 29, 30 and 31 issues a "true" output. Therefore, the counter 28 is reset in the above case. Supposing that the output of the absolute value circuit 14 is equal to or less than 15 in the foregoing example, all of the comparators 29, 30 and 31 issue "false" outputs. In this case, there exists no matching quantization level for the first sample, so the process proceeds to comparison of the subsequent sample. Thus, the initial value updating circuit 12, subtraction circuit 13 and absolute value circuit 14 operate in a like manner to the above, and the absolute value circuit 14 outputs |ΔS2|, The counter 28 is counted up and issues the output of 2. Accordingly, the ROM 27 now outputs 8 and 17 to the comparators 29 and 30 in the example of using the table of FIG. 3, the respectively. Thereafter, the similar process will be repeated to find a matching quantization level for each of a successive sample numbers. If not found, it proceeds to processing of the subsequent sample. In accordance with the exemplary table of FIG. 3, when the process finally reaches the sample number 5, the ROM 32 outputs the index 7 and the representative value 0 irrespective of the output value of the absolute value circuit 14. The index in the output of the ROM 32 is supplied to a register 33 constituting the transmitter 17, and then delivered from the output terminal 18 together with the sign supplied from the full adder 25. The representative value in the output of the ROM 32 is supplied to the full adder 23.

While the present invention has been described with reference to the quantization table shown in FIG. 3 by way of example, the quantization table is not limited to the illustrated one. Thus, the number of indices, the magnitude of sample numbers, the ranges of threshold values, and representative values may have optional values so long as they will not be contradictory to each other. Therefore, the number of comparators to be included in the comparison circuit 16 depends on the configuration of each quantization table.

With the operation as mentioned above, the part of signal which has an amplitude value changing steeply is quantized at the first sample, but the sample number proceeds in order of 2, 3, 4 and 5 as the signal changes more moderately. As a result, the original sampling interval is widened and hence the amount of data is reduced. Generally speaking, since the natural image or audio signal has many moderately changing parts as a whole, the present method makes it possible to increase the compression gate.

Figure 4:
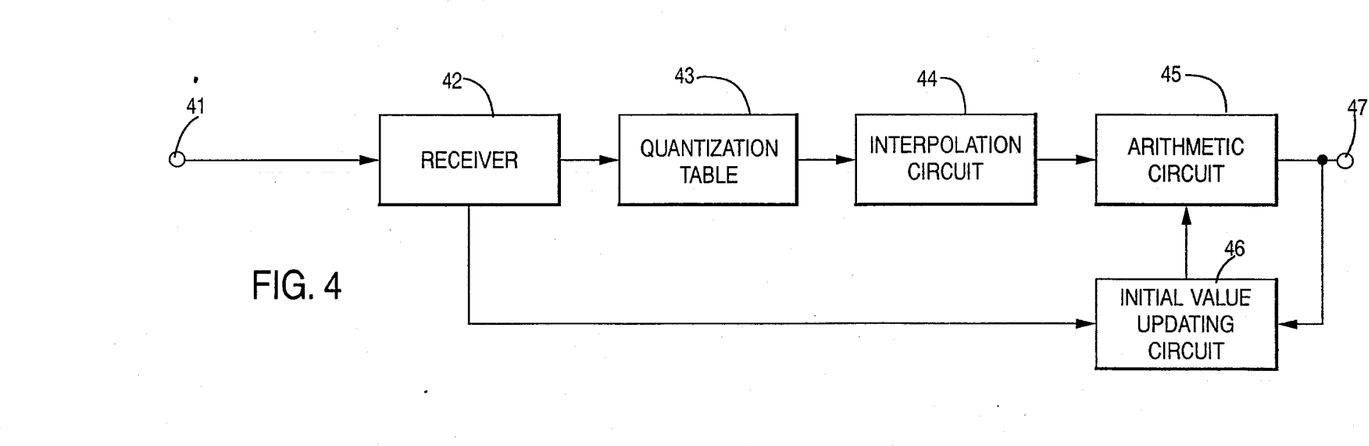
FIG. 4 is a block diagram of one embodiment of a decoding device for decoding the encoded data according to the method of the present invention.

FIG. 4 shows one embodiment of a decoding device according to the present invention. The decoding device of FIG. 4 comprises an input terminal 41, a receiver 42, a quantization table 43, an interpolation circuit 44, an arithmetic circuit 45, an initial value updating circuit 46, and an output terminal 47. A series of encoded data is inputted to the input terminal 41 and then supplied to the receiver 42. The receiver 42 separates the initial value $S_i$ from the index k and the sign F. The initial value is supplied to the initial value updating circuit 46, and the index and the sign are supplied to the quantization table 43. The quantization table 43 has the same quantization table as used in the encoding device, and outputs the sample number and the representative value upon receiving the index applied thereto. The representative value is added with the positive or negative sign and then supplied to the interpolation circuit 44. The interpolation circuit 44 calculates one or more interpolation values from the sample number and the representative value. The case of sample number 1 does not require interpolation, but the case of sample number 2 or more requires interpolation. The interpolated data is in the form of series of difference values and supplied to the arithmetic circuit 45. In the arithmetic circuit 45, the initial value held in the initial value updating circuit 46 and the series of difference values are sequentially added to give a series of decoded signals, which is then delivered from the output terminal 47. The final value in the data series from the arithmetic circuit 45 is supplied to the initial value updating circuit 46 for updating the previous initial value.

Figure 5:
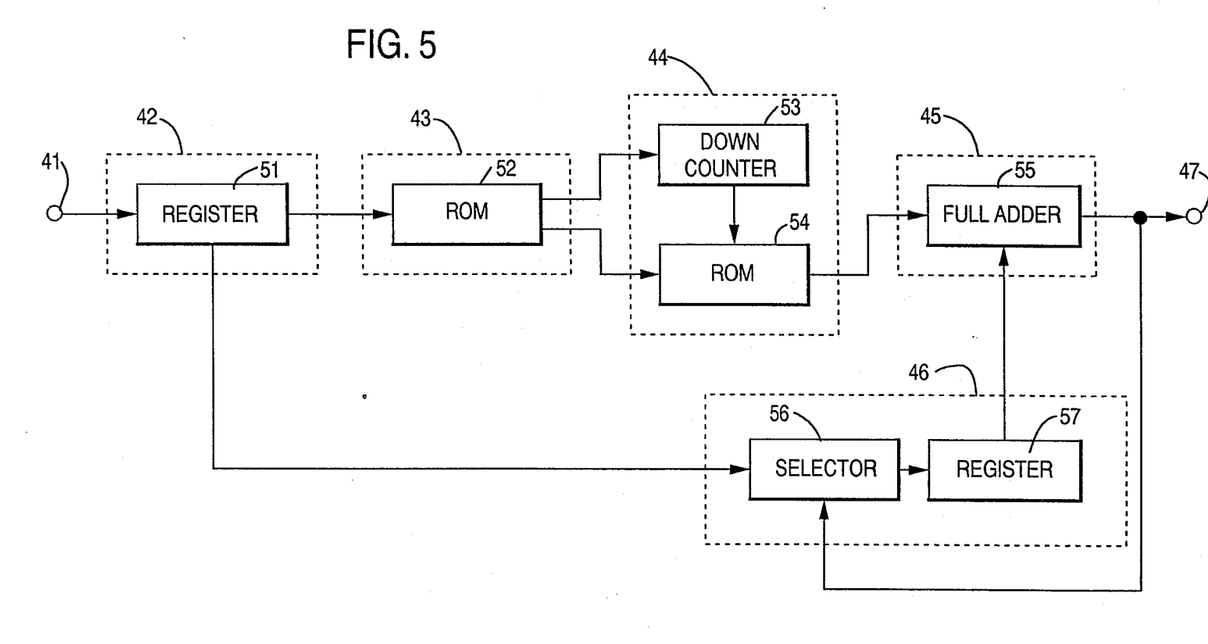
FIG. 5 is a more detailed block diagram of FIG. 4.

FIG. 5 is a more detailed block diagram of FIG. 4. The receiver 42 comprises a register 51. The register 51 separates the initial value out of the data series encoded by encoding device, followed by supplying it to the initial value updating circuit 46, while it supplies the index and the sign to the quantization table 43.

The quantization table 43 comprises a ROM 52. The ROM 52 outputs the sample number and the representative value using the index and the sign as address inputs. If the encoding device employs the quantization table shown in FIG. 3, the decoding device has also to employ the same quantization table as shown in FIG. 3. The representative value output from the ROM 52 is given by the representative value shown in FIG. 3 added with the positive or negative sign.

The interpolation circuit 44 comprises a down counter 53 and a ROM 54. The sample number outputted from the ROM 52 is loaded into the down counter 53. The representative value delivered from the ROM 54 and the output of the down counter 53 are supplied to a ROM 54 as addresses for accessing. Responsively, the ROM 54 outputs the interpolation value which is previously calculated and stored herein.

The arithmetic circuit 45 comprises a full adder 55. The full adder 55 adds the output of the ROM 54 and the initial value stored in a register 57 of the initial value updating circuit 46, and then supplies the resulting sum to the output terminal 47. A selector 56 of the initial value updating circuit 46 makes switching action to selects either the initial value supplied from the register 51 or the final output value from the full adder 55. Only upon the register 51 detecting the initial value, the selector 56 is switched to the side of the register 51. The output of the selector 56 is supplied to the register 57. The new initial value is stored in the register 57 and, at the same time, the register 51 supplies the subsequent index and sign to the ROM 52 for repeating the above process.

While both the index and the sign were employed as input addresses for the ROM storing the quantization table in the foregoing embodiment, it may be configured that only the index is employed as an input address for the ROM, and the sign is directly added to the output of the ROM for providing the representative value with the positive or negative sign. Also, while the interpolation circuit was consisted of the down counter and the ROM, it is not limited to such configuration and may comprise, for example, an up counter, a comparator and a ROM.

Figure 6:
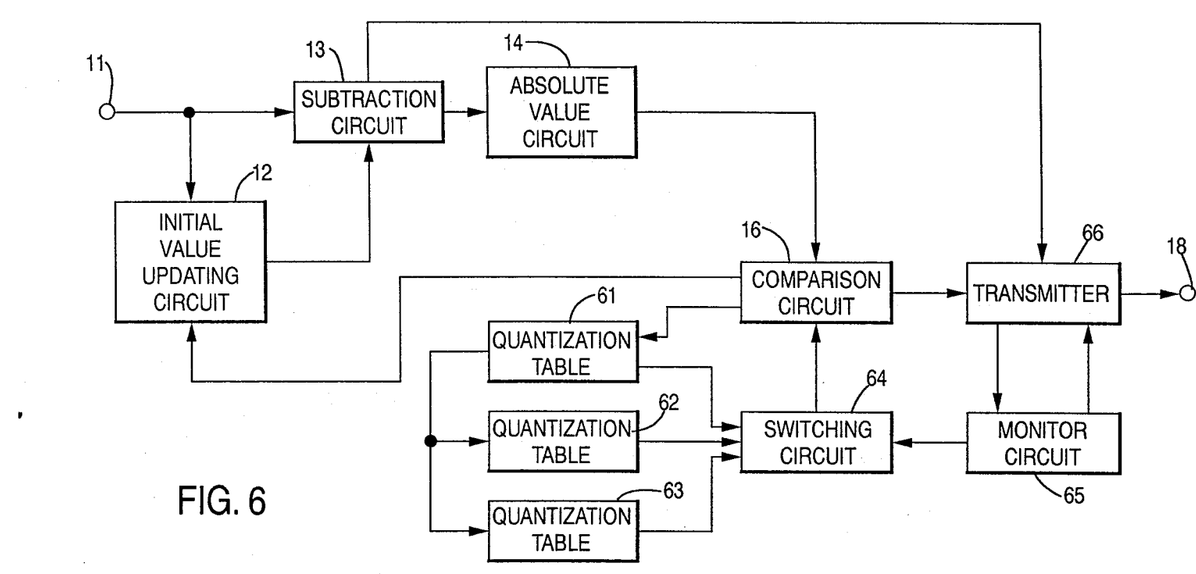
FIG. 6 is a block diagram of another embodiment of an encoding device for encoding signals according to the method of the present invention.

FIG. 6 is a block diagram of another embodiment of an encoding device according to the present invention. The encoding device of FIG. 6 comprises an input terminal 11, an initial value updating circuit 12, a subtraction circuit 13, an absolute value circuit 14, three quantization tables 61, 62 and 63, a comparision circuit 16, a transmitter 66, a switching circuit 64, a monitor circuit 65, and an output terminal 18. Applied to the input terminal 11 is a series of image or audio data after being subjected to sampling and quantizing. First, an initial value Si is held in the initial value updating circuit 12. The initial value $S_i$ is also supplied to the transmitter 17. The subsequent data $S_{i+1}$ and the output $S_i$ of the initial value updating circuit 12 are supplied to a subtraction circuit 13 where both $\Delta S1 = S_{i+1} - S_i$ and the sign $F1 = \text{sign}(\Delta S1)$ are calculated. Then, the output $\Delta S1$ of the subtraction circuit 13 is supplied to the absolute value circuit 14, and F1 is supplied to the transmitter 66. The absolute value circuit 14 calculates an absolute value $|\Delta S1|$ of $\Delta S1$ and sends it to the comparison circuit 16. On the other hand, the quantization tables 61, 62 and 63 output the respective threshold values of first quantization scales and supply them to the switching circuit 64. The switching circuit 64 selects and outputs a proper input dependent on the output of the monitor circuit 65. The comparison circuit 16 compares the threshold value of the selected quantization table with the absolute value $|\Delta S1|$ to check to which quantization level the absolute value $|S1|$ belongs. If a matching quantization level is found, the comparison circuit 16 supplies the index of quantization level to the transmitter 66. Concurrently, the sign F1 is supplied from the subtraction circuit 13 to the transmitter 66. Further, the representative value Rk of the selected index is supplied to the initial value updating circuit 12. The initial value updating circuit 12 updates the sum of the initial value $S_i$ originally held therein and the representative value Rk as a new initial value.

If the absolute value $|\Delta S1|$ is less than the minimum threshold value of quantization scale for the first sample, the matching quantization level cannot be found. Thus, the subsequent data $S_{i+2}$ is supplied to the subtraction circuit 13 where $\Delta S2 = S_{i+2} - S_i$ is calculated. $\Delta S2$ is processed in a like manner to $\Delta S1$ through the above-mentioned steps. The transmitter 66 supplies respective values of input rate and output rate to the monitor circuit 65. The monitor circuit 65 calculates the integrated value of differences between the input rate and the output rate, and converts it to a switching signal which is delivered to the switching circuit 64.

This embodiment has a function to maintain constant the data output rate of the encoding device. The quantization tables 61, 62 and 63 have their quantization scales made up such that when those three quantization tables are used for the same input signal, the first quantization table 61 produces the largest amount of decoded data, the third quantization table 63 produces the least amount of decoded data, and the second quantization table 62 produces the intermediate amount of decoded data. Provided that the input data rate is higher than the output data rate owing to the complicated input signal, the transmission will soon be crashed. To avoid such crash, the monitor circuit 65 integrates the difference between the input rate and the output rate at all time, and converts the integrated value to the switching signal. It is assumed that the first quantization table 61 is selected by the switching circuit 64 at the first stage. When the input rate exceeds the output rate in this stage, the switching circuit 64 outputs such a selection signal as by which the second quantization table 62 is selected. When the input rate still yet exceeds the output rate, another selection signal is output to select the third quantization table 63. To the contrary, when the input rate is below the output rate, the switching circuit 64 is controlled to sequentially select the third quantization table 63, second quantization table 62 and first quantization table 61 in this order. This prevents the encoding device from coming into crash, while keeping the output rate kept at constant.

Figure 7:
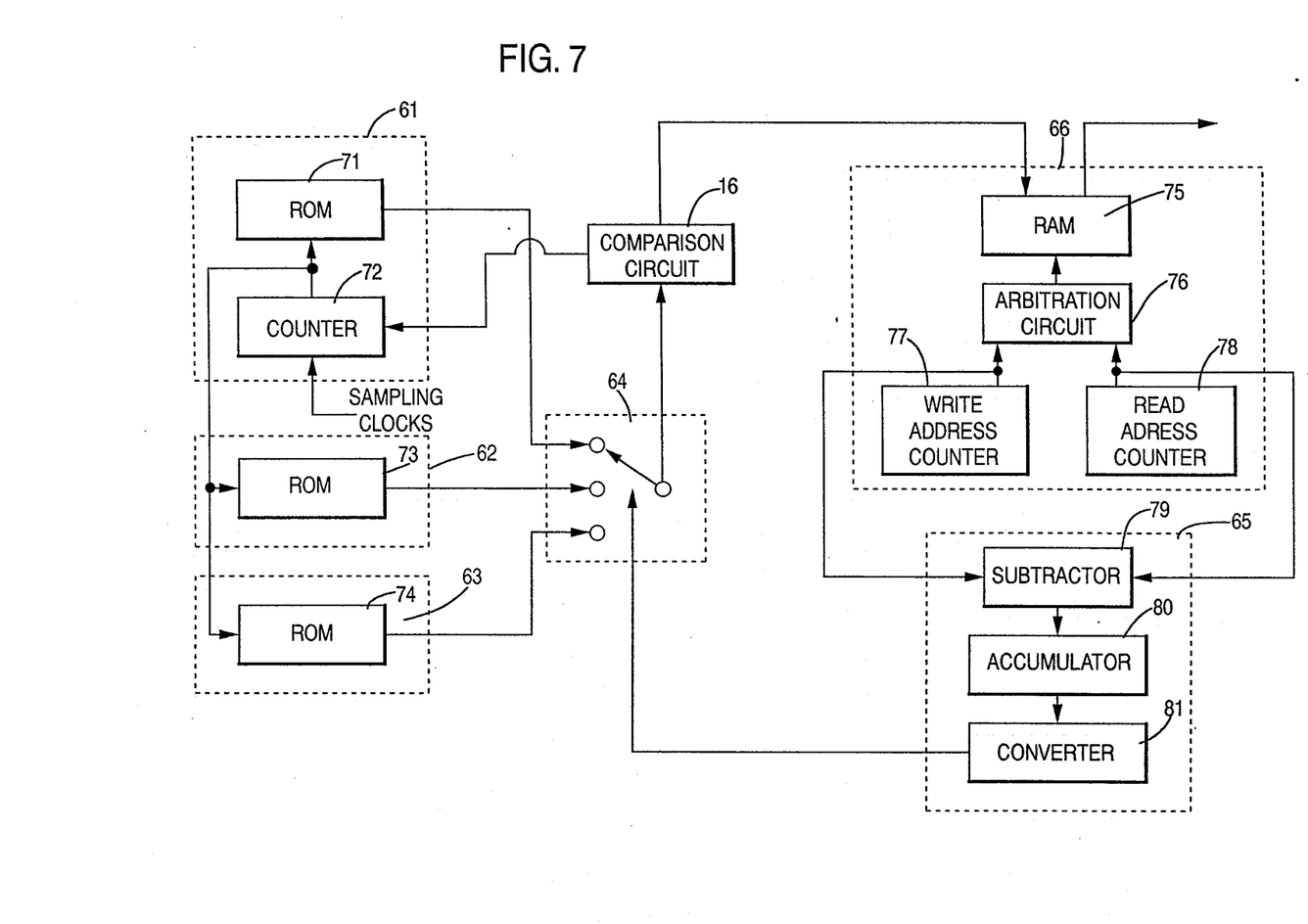
FIG. 7 is a more detailed block diagram of FIG. 6.

FIG. 7 is a more detailed block diagram of the quantization tables 61, 62 and 63, switching circuit 64, monitor circuit 65, and transmitter 66 of FIG. 6. The first quantization table 61 comprises a ROM 71 and a counter 72. The second quantization table 62 comprises a ROM 73, and the third quantization table 63 comprises a ROM 74. The counter 72 is counted up by signal sampling clocks, and reset by the comparison circuit 16 when it detects a matching quantization level. The ROM's 71, 73 and 74 are operated synchronously by virtue of the counter 72. The switching circuit 64 makes switching action to select any one of the threshold value outputs from the ROM's 71, 73 and 74, and the delivers the selected one to the comparison circuit 16.

The transmitter 66 comprises a RAM (Random Access Memory) 75, an arbitration circuit 76, a write address counter 77, and a read address counter 78. The input data such as index is written into the RAM 75. At this time, write addresses are produced by the write address counter 77 and applied to the RAM 75 via the arbitration circuit 76. Meanwhile, read addresses are produced by the read address counter 78 and applied to the RAM 75 via the arbitration circuit 76. Since the transmitter 66 is set to have the constant output rate, the arbitration circuit 76 passes the read addresses with higher priority, while keeping the write addresses queued.

The monitor circuit 65 comprises a subtractor 79, an accumulator 80 and a converter 81. The subtractor 79 subtracts the count value of the read address counter 78 from the count value of the write address counter 77, and then supplies the resulting difference to the accumulator 80. The accumulator 80 accumulates the differences about a predetermined value. The increased input rate advances the write address, which reduces the output value of the subtractor 79 so that the output value of the accumulator 80 becomes small. The converter 81 produces switching signals by which the switching circuit 64 selects the ROM 74 when the accumulator 80 has a small value, it selects the ROM 73 when the accumulator 80 has a value exceeding a first predetermined threshold value, and it selects the ROM 71 when the accumulator 80 has a value exceeding a second predetermined threshold value. This implements to effect such control as reducing the amount of index and sign data produced when the data input to the RAM 75 is increased, but increasing the amount of index and sign data produced when the data input to the RAM 75 is reduced.

The monitor circuit and the transmitter in this embodiment are not limited to the illustrated configurations. For example, the RAM 75 in the transmitter 66 may comprise a FIFO (First In First Out) memory.

What is claimed is:

1. A method of encoding an image and/or audio signal which is represented by quantized amplitude values at a plurality of sampling points and decoding the encoded signal, comprising the steps of:

an encoding step comprising the substeps of:
previously preparing a quantization table which has an ordered set of n quantization scales each having at least one quantization level identified by an index value, where n is a predetermined integer, said quantization level being defined by an amplitude range defined by a predetermined threshold value and having a representative value which is a single predetermined amplitude value in said amplitude range;
transmitting an amplitude value of a given sampling point as an initial value;

subtracting said initial value from an amplitude value of a next sampling point which is defined as an m-th sampling point counting from the sampling point of the initial value to calculate a difference value therebetween, where m is an integer between 1 and n, and calculating a sign and an absolute value of said difference value;

comparing the absolute value of said difference value with a threshold value of a quantization level in an m-th quantization scale of said ordered set of n quantization scales in said quantization table to find a matching quantization level having an amplitude range in which the absolute value of said difference value is included, and outputting an index value and a representative value of the matching quantization level when the matching quantization level is found in the m-th quantization scale and, when no matching quantization level is found in the m-th quantization scale, return to the subtracting step after incrementing the value of m by 1;

transmitting the index value of the matching quantization level and the sign of said difference value; and repeating the foregoing substeps after setting a sum of the representative value of the matching quantization level and said initial value as a new initial value; and a decoding step comprising the substeps of:
previously preparing the same quantization table as that used in the encoding step;
receiving a transmitted initial value;
receiving a transmitted index value and a transmitted sign and determining a sampling point number m and a representative value corresponding to the transmitted index value by using said quantization table;
interpolating an amplitude value of each m−1 sampling points between an initial sampling point of said initial value and an m-th sampling point counting from the initial sampling point by using said initial value and a product of the representative value and the sign of the m-th sampling point; and
repeating the foregoing substeps after setting the sum of said initial value and the representative value of the m-th sampling point as a new initial value.

2. A method according to claim 1, wherein the n-th quantization scale in said quantization table has a single quantization level whose representative value is zero.

3. A method according to claim 1, wherein said interpolation is effected by previously calculating respective interpolated amplitude values and holding the calculated values in the form of a table.

4. A method of encoding an image and/or audio signal which is represented by quantized amplitude values at a plurality of sampling points, comprising the steps of:
previously preparing a quantization table which has an ordered set of n quantization scales each having at least one quantization level identified by an index value, where n is a predetermined integer, said quantization level being defined by an amplitude range defined by a predetermined threshold value and having a representative value which is a single predetermined amplitude value in said amplitude range;

transmitting an amplitude value of a given sampling point as an initial value;

subtracting said initial value from an amplitude value of a next sampling point which is defined as an m-th sampling point counting from the sampling point of the initial value to calculate a difference value therebetween, where m is an integer between 1 and n, and calculating a sign and an absolute value of said difference value;

comparing the absolute value of said difference value with a threshold value of a quantization level in an m-th quantization scale of said ordered set of n quantization scales in said quantization table to find a matching quantization level having an amplitude range in which the absolute value of said difference value is included, and outputting an index value and a representative value of the matching quantization level when the matching quantization level is found in the m-th quantization scale and, when no matching quantization level is found in the m-th quantization scale, return to the subtracting step after incrementing the value of m by 1;

transmitting the index value of the matching quantization level and the sign of said difference value; and repeating the foregoing steps after setting a sum of the representative value of the matching quantization level and said initial value as a new initial value.

5. An apparatus for encoding an image and/or audio signal which is represented by quantized amplitude values at a plurality of sampling points, comprising:
a quantization table which has an ordered set of n quantization scales each having at least one quantization level identified by an index value k, where n is a predetermined integer, said quantization level being defined by an amplitude range defined by a predetermined threshold value and having a representative value $R_k$ which is a single predetermined amplitude value in said amplitude range;
a means for calculating a difference value $\Delta S_m = S_{i+m} - S_i$ between an initial value $S_i$ which is an amplitude value at an initial sampling point i and an amplitude value $S_{i+m}$ at a succeeding sampling point m, where m = 1,2,3, . . . ,n;
means for calculating an absolute value $|\Delta S_m|$ and a sign $F_m$ of said difference value $\Delta S_m$;
a means for comparing the absolute value $|S_m|$ of said difference value with a threshold value of a quantization level in an m-th quantization scale of said ordered set of n quantization scales in said quantization table to find a matching quantization level having an amplitude range in which the absolute value of said difference value is included, and outputting an index value k and a representative value $R_k$ of the matching quantization level when the matching quantization level is found in the m-th quantization scale;
a means responsive to the output from said comparing means for advancing the initial sampling point i by m and replacing the initial value $S_i$ by a new initial value $S_{i(i=i+m)} = S_i + R_k$; and
a means for transmitting the inital value $S_i$, the index value k of the matching quantization level and the sign $F_m$ of said differences value $\Delta S_m$.

6. An apparatus for decoding an encoded image and/or audio signal transmitted from an encoding apparatus of claim 5, comprising:

a means for receiving and separating an initial value $S_i$, an index value k and a signal $F_m$ transmitted from said encoding apparatus;

a quantization table which is the same as the quantization table used in said encoding apparatus for outputting a representative value Rk corresponding to the index value k;

a means for adding the initial value $S_i$ to a product of the representative value Rk outputted from said quantization table and the sign $F_m$ to obtain a value $S_i + Rk \cdot F_m$;

a means for interpolating amplitudes of m−1 samples between an initial sampling point i of the initial value $S_i$ and an (i+m)-th sampling point using the initial value $S_i$ and an output value $S_i + Rk \cdot F_m$ of the adding means; and a means for substituting the initial value $S_i$ by the output value $S_i + Rk \cdot F_m$ of the adding means as a new initial value.

7. An apparatus for encoding an image and/or audio signal which is represented by quantized amplitude values at a plurality of sampling points, comprising:

a plurality of quantization tables each of which has an ordered set of quantization scales each having at least one quantization level identified by an index value k, said quantization level being defined by an amplitude range defined by a predetermined threshold value and having a representative value Rk which is a single predetermined amplitude value in said amplitude range, each of said plurality of quantization tables having a different set of quantization scales from that of another;

a means for selecting one of said plurality of quantization tables;

a means for calculating a difference value $\Delta S_m = S_{i+m} - S_i$ between an initial value $S_i$ which is an amplitude value at an initial sampling point i and an amplitude value $S_{i+m}$ at a succeeding sampling point m, where m = 1,2,3, . . .;

a means for calculating an absolute value $|\Delta S_m|$ and a sign $F_m$ of said difference value $\Delta S_m$;

a means for comparing the absolute value $|\Delta S_m|$ of said difference value with a threshold value of a quantization level in an m-th quantization scale of said ordered set of quantization scales in said selected quantization table to find a matching quantization level having an amplitude range in which the absolute value of said difference value is included, and outputting an index value k and a representative value Rk of the matching quantization level when the matching quantization level is found in the m-th quantization scale;

a means responsive to the output from said comparing means for advancing the initial sampling point i by m and replacing the initial value $S_i$ by a new initial value $S_{i(i=i+m)} = S_i + Rk$; and a means for transmitting the initial value $S_i$, the index value k of the matching quantization level and the sign $F_m$ of said difference value $\Delta S_m$ at a constant data rate; and a means for monitoring an input data rate and an output data rate of said transmitting means, and controlling said selecting means based on the monitoring result.

* * * * *